United States Patent
Nawate

(10) Patent No.: US 10,272,757 B2
(45) Date of Patent: Apr. 30, 2019

(54) SEALING STRUCTURE OF DOOR WEATHER STRIP

(71) Applicant: NISHIKAWA RUBBER CO., LTD., Hiroshima-shi, Hiroshima-ken (JP)

(72) Inventor: Kouji Nawate, Hiroshima (JP)

(73) Assignee: NISHIKAWA RUBBER CO., LTD., Hiroshima-Shi (JP)

( * ) Notice: Subject to any disclaimer, the term of this patent is extended or adjusted under 35 U.S.C. 154(b) by 28 days.

(21) Appl. No.: 15/449,314

(22) Filed: Mar. 3, 2017

(65) Prior Publication Data

US 2017/0274749 A1  Sep. 28, 2017

(30) Foreign Application Priority Data

Mar. 22, 2016 (JP) .................. 2016-057182

(51) Int. Cl.
| | | |
|---|---|---|
| B60J 10/86 | (2016.01) | |
| B60J 10/22 | (2016.01) | |
| B60J 10/24 | (2016.01) | |
| B60J 10/21 | (2016.01) | |
| B60J 10/246 | (2016.01) | |
| B60J 10/50 | (2016.01) | |

(52) U.S. Cl.
CPC ............. B60J 10/86 (2016.02); B60J 10/21 (2016.02); B60J 10/22 (2016.02); B60J 10/24 (2016.02); B60J 10/246 (2016.02); B60J 10/50 (2016.02)

(58) Field of Classification Search
CPC . B60J 10/24; B60J 10/248; B60J 10/21; B60J 10/86; B60J 10/50
See application file for complete search history.

(56) References Cited

U.S. PATENT DOCUMENTS

| | | | | |
|---|---|---|---|---|
| 4,928,431 A | * | 5/1990 | Kuzuhara ................ | B60J 10/21 49/479.1 |
| 6,250,018 B1 | * | 6/2001 | Kawai ...................... | B60J 10/22 49/475.1 |
| 6,386,619 B1 | * | 5/2002 | Tsuchida .................. | B60J 10/30 296/146.9 |
| 6,393,766 B2 | * | 5/2002 | Nozaki .................... | B60J 10/24 49/475.1 |
| 6,405,489 B1 | * | 6/2002 | Miura ...................... | B60J 10/24 49/475.1 |

(Continued)

FOREIGN PATENT DOCUMENTS

JP    2010-052623 A    3/2010

*Primary Examiner* — Justin B Rephann
(74) *Attorney, Agent, or Firm* — Robert P. Michal, Esq.; Carter, DeLuca & Farrell LLP

(57) ABSTRACT

An outer lip is continuous with an outer-cabin side wall which has a linear shape of a hollow seal member. The outer lip makes elastic contact with a surface of a body in a direction substantially perpendicular when a door is closed. A rear lip extends from a position close to a base root of the outer lip toward an outer-cabin side and makes elastic contact with a peripheral edge of the door. A thickness of the outer-cabin side wall of the hollow seal member is not less than a thickness of a vertical part of the outer lip; and an inner-cabin side surface of the outer-cabin side wall of the hollow seal member is closer to an inside of the automobile than an inner-cabin side surface of the vertical part of the outer lip.

12 Claims, 7 Drawing Sheets

(56) References Cited

U.S. PATENT DOCUMENTS

| | | | | |
|---|---|---|---|---|
| 6,499,257 | B1* | 12/2002 | Tsuchida | B60J 10/248 49/493.1 |
| 7,197,850 | B2* | 4/2007 | Mizutani | B60J 10/24 49/475.1 |
| 8,973,307 | B2* | 3/2015 | Eguchi | B60J 10/0017 49/476.1 |
| 9,415,671 | B2* | 8/2016 | Sentani | B60J 10/22 |
| 2004/0250474 | A1* | 12/2004 | Kubo | B29C 45/0053 49/479.1 |
| 2005/0178069 | A1* | 8/2005 | Iwasa | B60J 10/22 49/498.1 |
| 2006/0042170 | A1* | 3/2006 | Furuzawa | B60J 10/248 49/489.1 |
| 2006/0137255 | A1* | 6/2006 | Nozaki | B60J 10/248 49/498.1 |
| 2007/0245635 | A1* | 10/2007 | Deguchi | B60J 10/248 49/498.1 |
| 2009/0056229 | A1* | 3/2009 | Mugishima | B60J 10/248 49/493.1 |
| 2014/0000174 | A1* | 1/2014 | Minagawa | E06B 7/2305 49/483.1 |
| 2015/0210149 | A1* | 7/2015 | Saiki | B60J 10/085 296/152 |
| 2015/0266364 | A1* | 9/2015 | Im | B60J 10/0017 49/495.1 |
| 2015/0283888 | A1* | 10/2015 | Togashi | B60J 10/246 49/480.1 |
| 2015/0360547 | A1* | 12/2015 | Ogawa | B60J 5/0479 49/368 |
| 2016/0144696 | A1* | 5/2016 | Sentani | B60J 10/22 49/483.1 |

* cited by examiner

33cS > 32aS ure 12aF of the outer-cabin side wall 12a of the hollow seal member 12. Under the configuration shown in FIG. 9, the reaction force is generated when the outer lip 13 makes elastic contact with the body 10. In other words, when an end of the outer-cabin side wall 12a, which is on a side of a base root 13b of the outer lip 13, of the hollow seal member 12 falls down toward the inner-cabin side with respect to an end on a side of the installation base member 11, a position on the body 10 touched by the outer lip 13 for sealing is moved toward the inner-cabin side. This configuration allows appearance of an unnecessary large space among the outer lip 13, a peripheral edge of a door panel and a peripheral edge of the body opening edge. The unnecessary large space has caused problems such as entrance of water and wind, and occurrence of noise. In addition, when the door weather strip 3 includes the rear lip 14, the rear lip 14 strays from the peripheral edge of the door panel, and water enters the inner-cabin side through a gap between the rear lip 14 and the peripheral edge of the door panel.

SEALING STRUCTURE OF DOOR WEATHER STRIP

CROSS REFERENCE TO RELATED APPLICATION

This application claims the benefit under 35 USC § 119 of JP Patent Application JP 2016-057182 filed Mar. 22, 2016, the entire disclosure of which is incorporated herein by reference.

BACKGROUND INFORMATION

The present invention relates to door weather strips operatively coupled to peripheral edges of automobile doors for sealing gaps between doors and bodies by making elastic contact with the bodies of the automobiles.

As shown in FIG. 7 to FIG. 9, door weather strips 3,4 have been operatively coupled to peripheral edges of doors 1, 2 (front door 1, rear door 2) of an automobile for sealing a gap between the doors 1, 2 and an automobile body opening edge of a body 10.

As shown in FIG. 8, the door weather strips 3, 4 are formed by connecting die molded parts 71, 72, 73, 74 to extrusion molded parts 61, 62, 63, 64. The extrusion molded parts 62, 64 are operatively coupled to upper parts (roof sides) of the peripheral edges of the doors 1, 2. The die molded parts 71, 72, 73, 74 are operatively coupled to upper corner parts which are continuous with the extrusion molded parts 62, 64.

As shown in FIG. 9, the die molded parts of the door weather strip 3 include: an installation base member 11 operatively coupled to the peripheral edge of the door 1; a hollow seal member 12 which is integrally molded with the installation base member 11 and which makes elastic contact with a door opening edge of the body 10 when the door 1 is in a closed position; and an outer lip 13 integrally molded with the installation base member 11. A rear lip 14 protrudes from a position between the installation base member 11 and the outer lip 13, and a top end of the rear lip 14 makes elastic contact with the peripheral edge of the door 1. The installation base member 11 has a hole 15 or a slit formed thereon for pulling out a core (not shown) after die molding.

On a corner part of the door 1 (also the rear door 2), a track of movement 80 of the door 1 is substantially perpendicular to a surface of the body 10 when the door 1 is in the closed position. With this configuration, a top end 13a of the outer lip 13 makes elastic contact with the surface of the body 10 in a direction substantially perpendicular. Accordingly, when force of the top end 13a for making elastic contact with the body 10 increases, the top end 13a of the outer lip 13 may fall down toward an inner-cabin side, so called "reverse" in another word. More specifically, the configuration that the track of movement 80 of the door 1 intersects the surface of the body 10 at a large angle of not less than 45 degrees causes malfunction. An angle of not less than 70 degrees causes more malfunction. Especially, when the track of movement 80 of the door 1 intersects the surface of the body 10 at an angle of not less than 80 degrees, the outer lip 13 may fall down toward the inner-cabin side.

Even in case the top end 13a of the outer lip 13 does not reverse, under the configuration shown in FIG. 9, an outer-cabin side wall 12a, which has a linear shape, of the hollow seal member 12 may fall down toward the inner-cabin side due to reaction force from the outer lip 13. In FIG. 9, a position 13P on an inner-cabin side of the outer lip 13 is closer to an inside of the automobile than an inner-cabin side In this connection, as shown in FIG. 9, forming an inner-cabin side sealing rib 16 between the outer lip 13 and the hollow seal member 12 has been known for increasing rigidity of the outer lip 13 (see, for example, Japanese unexamined Patent Publication No. 2010-52623). Additionally, an outer-cabin side sealing rib 17 may be formed between the outer lip 13 and the rear lip 14.

But, forming the ribs 16, 17 between the outer lip 13 and the hollow seal member 12 or between the outer lip 13 and the rear lip 14 necessitates extra materials for die molding. In addition, the outer lip 13 is hard to deal with. Specifically, the outer lip 13, the rigidity of which is excessively increased, causes problems that: door closability is degraded; sealing performance for preventing entrance of water is degraded, for water or dust easily collects on a sealing surface which abuts with the body 10. Also, the ribs 16, 17, which are exposed outside, degrade appearance.

Accordingly, an object of the present invention is to provide the sealing structures of door weather strips capable of improving the sealing performance and the appearance by simply transforming cross-sectional shapes.

SUMMARY

In order to achieve the above-mentioned object, according to one aspect of the invention, a sealing structure of a door weather strip (30) is provided, the door weather strip (30) including: an installation base member (31) operatively coupled to a peripheral edge of a door (1) of an automobile; a hollow seal member (32) which is integrally molded with an inner-cabin side and an outer-cabin side of the installation base member (31) and which makes elastic contact with a door opening edge of a body (10) when the door (1) is in a closed position; and an outer lip (33) integrally molded with an outer-cabin side of the hollow seal member (32);

an outer-cabin side wall (32a) of the hollow seal member (32) having a linear shape, the outer-cabin side wall (32a) extending from the outer-cabin side of the installation base member (31) toward a side of the door opening edge of the body (10), a base root (33b) of the outer lip (33) being continuous with the outer-cabin side wall (32a) of the hollow seal member (32), a top end (33a) of the outer lip (33) being bent toward an outer-cabin side, a vertical part (33c) of the outer lip (33) extending toward the door opening edge of the body (10), the vertical part (33c) connecting the base root (33b) and the top end (33a) of the outer lip (33), the vertical part (33c) being substantially in parallel with the outer-cabin side wall (32a) of the hollow seal member (32), the outer lip (33) making elastic contact with a surface of the body (10) in a direction substantially perpendicular when the door (1) is closed, wherein:

a thickness (32aS) of the outer-cabin side wall (32a) of the hollow seal member (32) is not less than a thickness (33cS) of the vertical part (33c) of the outer lip (33); and an inner-cabin side surface (32aF) of the outer-cabin side wall (32a) of the hollow seal member (32) is closer to an inside of the automobile than an inner-cabin side surface (33cF) of the vertical part (33c) of the outer lip (33).

In addition, according to an aspect of the present invention, the door weather strip (30) includes a rear lip (34), the rear lip (34) extending from the outer lip (33) toward the outer-cabin side, the rear lip (34) making elastic contact with the peripheral edge of the door (1), the rear lip (34) extending from an outer-cabin side surface (33cE) of the vertical part (33c) of the outer lip (33).

The "vertical part (33c)" is the part of the outer lip (33) on the side of the base root (33b). The vertical part (33c) connects with the top end (33a) bent toward the outer-cabin side by way of a corner (33n). When the outer lip (33) makes elastic contact with the body (10), the outer lip (33) bends for sealing around the corner (33n) as a bending point. The outer lip (33) in the sentence "the outer lip (33) making elastic contact with a surface of the body (10) in a direction substantially perpendicular when the door (1) is closed" especially indicates the vertical part (33c) of the outer lip (33). The sentence "making elastic contact with a surface of the body (10) in a direction substantially perpendicular" includes configurations that a track of movement 80 of the door 1 intersects the surface of the body 10 at an angle of not less than 45 degrees (intersection angle 500≥45 degrees), an angle of not less than 70 degrees (intersection angle 500≥70 degrees) and an angle of not less than 80 degrees (intersection angle 500≥80 degrees). More strictly, the sentence includes an angle of approximately 90 degrees (an angle of more than 90 degrees also) as well as the angle of 90 degrees.

In addition, according to an aspect of the present invention, the door weather strip (30) is arranged on a position for a die molded part (71), the die molded part (71) being connected with a lower part of an extrusion molded part (62), the extrusion molded part (62) being positioned on a roof side of the automobile and making elastic contact with a roof when the door (1) is in the closed position.

In addition, according to an aspect of the present invention, the die molded part (71) continuously includes a part in a longitudinal direction of the door weather strip (30), the part meeting conditions that: the thickness (32aS) of the outer-cabin side wall (32a) of the hollow seal member (32) is not less than the thickness (33cS) of the vertical part (33c) of the outer lip (33); and the inner-cabin side surface (32aF) of the outer-cabin side wall (32a) of the hollow seal member (32) is closer to the inside of the automobile than the inner-cabin side surface (33cF) of the vertical part (33c) of the outer lip (33).

In addition, according to an aspect of the present invention, the die molded part (71) partially includes a part in a longitudinal direction of the door weather strip (30), the part meeting conditions that: the thickness (32aS) of the outer-cabin side wall (32a) of the hollow seal member (32) is not less than the thickness (33cS) of the vertical part (33c) of the outer lip (33); and the inner-cabin side surface (32aF) of the outer-cabin side wall (32a) of the hollow seal member (32) is closer to the inside of the automobile than the inner-cabin side surface (33cF) of the vertical part (33c) of the outer lip (33).

Symbols in parentheses show constituents or items corresponding to the drawings.

According to the present invention, the outer-cabin side wall which forms the hollow seal member of the door weather strip has the linear shape and extends from the outer-cabin side end of the installation base member toward the side of the door opening edge of the body when the door is in the closed position. In addition, the outer lip extends along the outer-cabin side wall of the hollow seal member. With this configuration, when the door is closed and the outer lip makes elastic contact with the surface of the body in the direction which is substantially perpendicular or more, the outer-cabin side wall of the hollow seal member is subjected to a reaction force directly from the outer lip.

Also, the thickness of the outer-cabin side wall of the hollow seal member is not less than the thickness of the vertical part of the outer lip. With this configuration, the linear outer-cabin side wall catches the reaction force from the outer lip stably and sufficiently. In addition, the inner-cabin side surface of the outer-cabin side wall of the hollow seal member is closer to the inside of the automobile than the inner-cabin side surface of the vertical part of the outer lip. Accordingly, even in case the outer-cabin side wall of the hollow seal member is subjected to the large reaction force, this configuration prevents an end of the outer lip on the side of the base root from falling down toward the inner-cabin side with respect to an end of the outer-cabin side wall on a side of the installation base member.

With this configuration, the force in a direction that the end of the outer lip on the side of the base root falls down toward the outer-cabin side acts on the end of the outer-cabin side wall on the side of the installation base member. This configuration increases force of the rear lip for making elastic contact with the door peripheral edge of the door and improves sealing performance.

Since the outer lip is prevented from falling down toward the inner-cabin side, reversing in another word, water does not enter the inner-cabin side from the peripheral edge of the door and appearance is improved.

In addition, the rear lip extends from the outer-cabin side surface of the vertical part of the outer lip. That is, if the outer-cabin side wall of the hollow seal part falls down, the rear lip is easily affected. In this connection, when the outer-cabin side wall of the hollow seal part of the door weather strip is stabilized, the door weather strip prevents the rear lip from straying from the peripheral edge of the door, prevents water from entering the inner-cabin side through a gap between the rear lip and the peripheral edge of the door, prevents occurrence of noise caused by an unnecessary large space, and therefore, is especially effective.

In addition, the door weather strip, with respect to the present invention, is arranged on the position for the die molded part. The die molded part is connected with the lower part of the extrusion molded part, which is positioned on the roof side of the automobile and makes elastic contact with the roof when the door is in the closed position. With this configuration, cross-sectional shapes of the hollow seal member and the outer lip are simply transformed.

Whether the die molded part includes the part, which meets the following conditions, continuously or partially, the door weather strip performs the sealing performance. Specifically, the part meets the conditions that: the thickness of the outer-cabin side wall of the hollow seal member is not less than the thickness of the vertical part of the outer lip; and the inner-cabin side surface of the outer-cabin side wall of the hollow seal member is closer to the inside of the automobile than the inner-cabin side surface of the vertical part of the outer lip.

DETAILED DESCRIPTION

Figure 7:
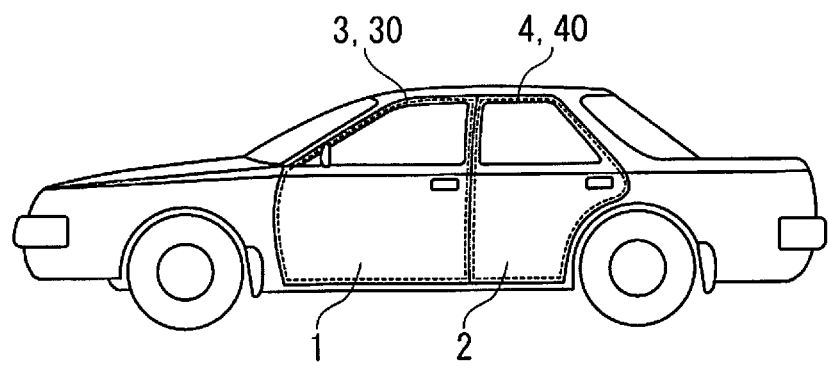
FIG. 7 is a side view of an outward appearance of an automobile.
Figure 8:
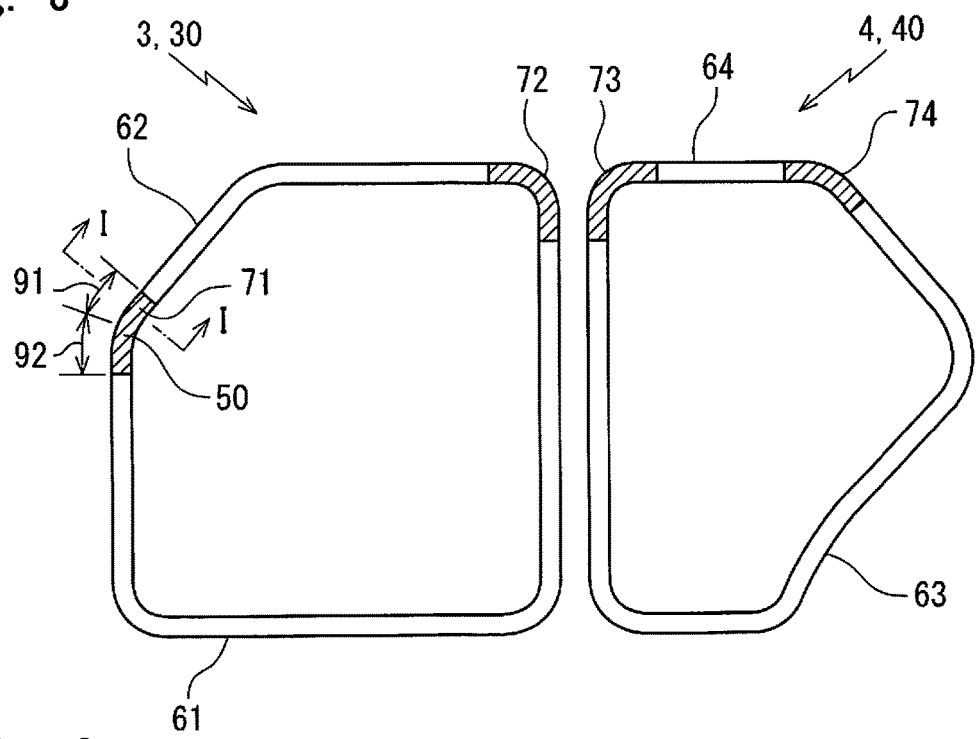
FIG. 8 is an enlarged side view of the door weather strip of FIG. 7.
Figure 9:
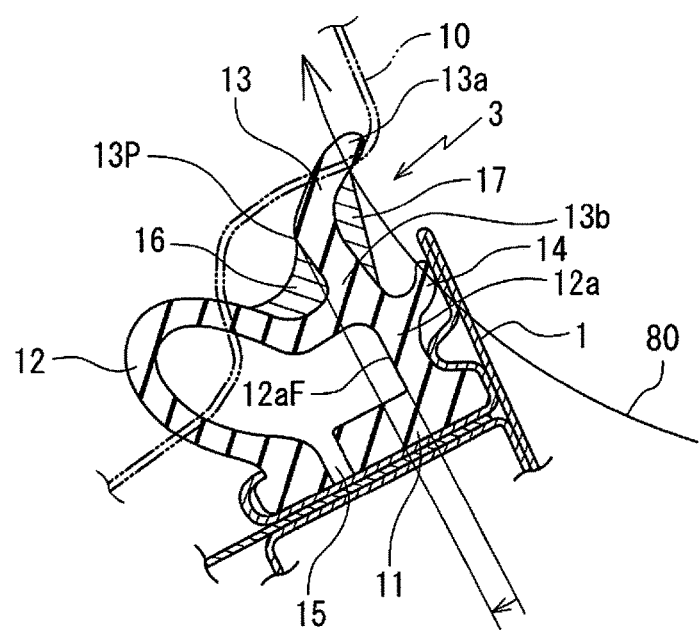
FIG. 9 is an I-I line enlarged cross section of FIG. 8, illustrating a sealing structure according to a prior art of a door weather strip.

Referring to FIGS. 1, 2, 7 and 8, a sealing structure according to an embodiment of the present invention of a door weather strip 30 will be described. FIG. 7 is a side view of an automobile with so-called "swing doors" in which rear ends of a front door 1 and a rear door 2 open outside on a circular arc track in a width direction of an automobile around hinge mechanisms as fulcrums. The hinge mechanisms are fixed on front ends of the doors and extend in an upper and lower direction. The door weather strip 30 is for use as a sealing structure of the door weather strip 30, which is arranged on a position for a die molded part 71 (FIG. 8) on the front door 1, especially, in a range 91 between a lower part of an extrusion molded part 62 and a corner part 50. The die molded part 71 is operatively coupled to a door edge of the front door 1 by the hinge mechanism. The die molded part 71 is connected with a lower part of an extrusion molded part 62, which is positioned on a roof side of the automobile and makes elastic contact with a roof when the front door 1 is in a closed position.

Figure 1:
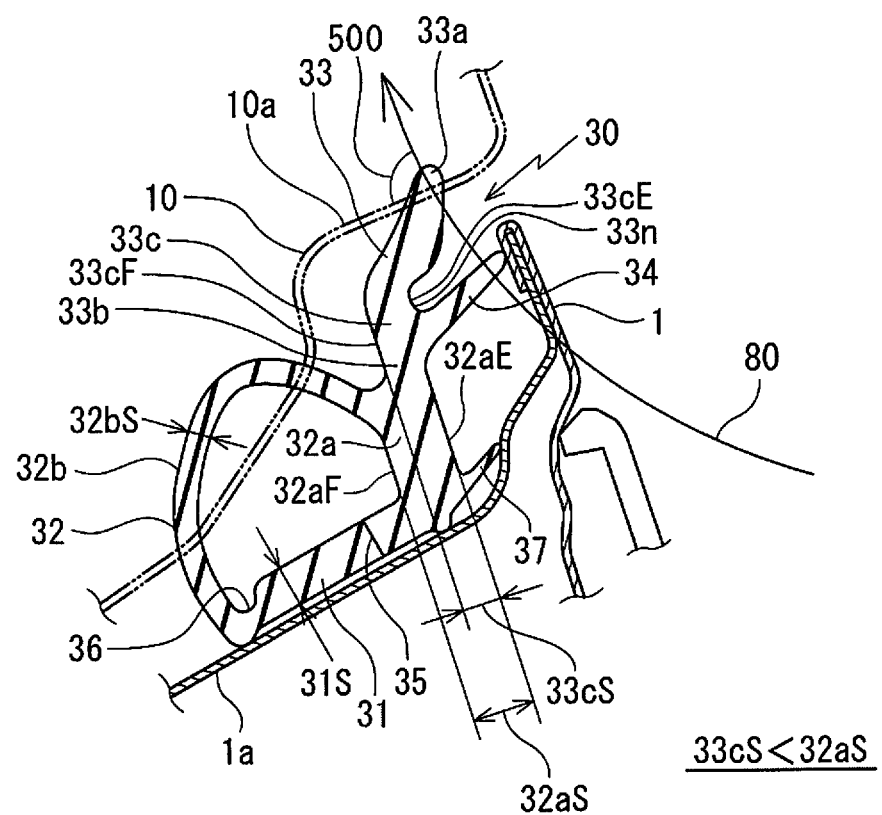
FIG. 1 is an I-I line enlarged cross section of FIG. 8, illustrating a sealing structure according to an embodiment of the present invention of a door weather strip.

As shown in FIG. 1, the door weather strip 30 according to the embodiment of the present invention includes: an installation base member 31 operatively coupled to a peripheral edge of a front door 1 of the automobile; a hollow seal member 32, which is integrally molded with an inner-cabin side and an outer-cabin side of the installation base member 31 and which makes elastic contact with a door opening edge of a body 10 when the front door 1 is in a closed position; an outer lip 33, which is integrally molded with an outer-cabin side of the hollow seal member 32 and which makes elastic contact with the door opening edge of the body 10 together with the hollow seal member 32 when the front door 1 is in the closed position; and a rear lip 34, which extends from a position close to a base root 33b of the outer lip 33 toward an outer-cabin side and makes elastic contact with the peripheral edge of the front door 1.

The installation base member 31 has a shape of a plate, of which width extends in an inner-outer cabin direction. The installation base member 31 is operatively coupled to a vertical surface 1a (surface which extends in the inner-outer cabin direction when the door is closed) of a door inner panel by a clip or a double sided tape, which are not shown. The vertical surface 1a is substantially perpendicular to a door surface (outward surface of the whole door) of the front door 1. A slit 35 (or a hole) is formed at a center of installation base member 31 in cross section for pulling out a core after die molding. In the present embodiment, the phrase "substantially perpendicular" includes an intersection angle of not less than 45 degrees, an intersection angle of not less than 70 degrees and an intersection angle of not less than 80 degrees. More strictly, the phrase includes an angle of approximately 90 degrees (an angle of more than 90 degrees also) as well as the angle of 90 degrees.

The installation base member 31 has: a notch 36 formed on an inner-cabin side end thereof; and a lip 37 formed on an outer-cabin side end thereof. Specifically, the notch 36 is formed on a position of connection with a seal wall 32b of the hollow seal member 32. The lip 37 makes elastic contact with the front door 1 and prevents entrance of water. The hollow seal member 32 includes: an outer-cabin side wall 32a and the seal wall 32b. The outer-cabin side wall 32a has a linear shape and extends from the outer-cabin side of the installation base member 31 toward a side of the door opening edge of the body 10, that is in a direction substantially perpendicular to the installation base member 31. The seal wall 32b is connected with: an inner-cabin side of an end of the outer-cabin side wall 32a; and the inner-cabin side end of the installation base member 31. The seal wall 32b is curved toward an outer circumference of the front door 1.

The outer lip 33 has a substantially tongue-shaped cross section and is formed on an outer-cabin side of the hollow seal member 32.

The outer lip 33 includes: a top end 33a; a base root 33b; and a vertical part 33c which connects the base root 33b and the top end 33a. The base root 33b of the outer lip 33 is continuous with the outer-cabin side wall 32a of the hollow seal member 32. The vertical part 33c is substantially in parallel with the outer-cabin side wall 32a of the hollow seal member 32 and extends toward the side of the door opening edge of the body 10, that is in the direction substantially perpendicular to the installation base member 31. The top end 33a of the outer lip 33 is bent from an end of the vertical part 33c toward the outer-cabin side by way of a corner 33n.

When the front door 1 is closed, a track of movement 80 of the front door 1 intersects a vertical surface 10a, which extends in an inner-outer cabin direction, of the body 10 in a direction substantially perpendicular and the outer lip 33 makes elastic contact with the vertical surface 10a of the body 10 in the direction substantially perpendicular. With this configuration, a direction in which the vertical part 33c forming the outer lip 33 extends is substantially in parallel with the track of movement 80 of the front door 1. In the present embodiment, the track of movement 80 of the front door 1 is depicted passing through the top end 33a of the outer lip 33. The phrase "a track of movement 80 of the front door 1 intersects a vertical surface 10a, which extends in an inner-outer cabin direction, of the body 10 in a direction substantially perpendicular" includes configurations that the track of movement 80 intersects the vertical surface 10a from an indoor side at an angle of not less than 45 degrees (intersection angle 500≥45 degrees), an angle of not less than 70 degrees (intersection angle 500≥70 degrees), an angle of not less than 80 degrees (intersection angle 500≥80 degrees) and more strictly, an angle of not less than 90 degrees.

In the same manner as the outer lip 33, the rear lip 34 has a substantially tongue-shaped cross section. The rear lip 34 extends from an outer-cabin side surface 33cE of the vertical part 33c of the outer lip 33 toward the outer-cabin side.

A thickness 32aS of the outer-cabin side wall 32a of the hollow seal member 32 is not less than a thickness 33cS of the vertical part 33c of the outer lip 33. In the present embodiment, the thickness 32aS is about one and half times the thickness 33cS.

Preferably, the thickness 32aS is not more than twice the thickness 33cS. It is preferable that: the thickness 32aS of the outer-cabin side wall 32a of the hollow seal member 32 is not less than 1 mm and not more than 2 mm; and the thickness 33cS of the vertical part 33c of the outer lip 33 is not less than 1 mm; for preventing lack of rigidity.

The thickness 33cS of the vertical part 33c of the outer lip 33 is the same as thickness of the base root 33b. Also, an inner-cabin side surface 32aF of the outer-cabin side wall 32a of the hollow seal member 32 is closer to the inside of the automobile than an inner-cabin side surface 33cF of the vertical part 33c of the outer lip 33. This configuration secures difference in thickness between the outer-cabin side wall 32a of the hollow seal member 32 and the outer lip 33. The thickness 32aS of the outer-cabin side wall 32a of the hollow seal member 32 is greater than a thickness 32bS of the seal wall 32b of the hollow seal member 32 or a thickness 31S of the installation base member 31.

An outer-cabin side surface 32aE of the outer-cabin side wall 32a of the hollow seal member 32 is flush with the outer-cabin side surface 33cE of the vertical part 33c of the outer lip 33.

According to the sealing structure according to the embodiment of the present invention of the above-structured door weather strip, the outer-cabin side wall 32a which forms the hollow seal member 32 of the door weather strip 30 has the linear shape and extends from an outer-cabin side end of the installation base member 31 toward the side of the door opening edge of the body 10 when the door is closed. In addition, the outer lip 33 extends along the outer-cabin side wall 32a of the hollow seal member 32. With this configuration, when the door is closed and the outer lip 33 makes elastic contact with the vertical surface 10a of the body 10 in the direction which is substantially perpendicular, the outer-cabin side wall 32a of the hollow seal member 32 is subjected to a reaction force directly from the outer lip 33.

Also, according to the embodiment of the present invention, the thickness 32aS of the outer-cabin side wall 32a of the hollow seal member 32 is not less than the thickness 33cS of the vertical part 33c of the outer lip 33. With this configuration, the linear outer-cabin side wall 32a catches the reaction force from the outer lip 33 stably and sufficiently. Also, the inner-cabin side surface 32aF of the outer-cabin side wall 32a of the hollow seal member 32 is closer to the inside of the automobile than the inner-cabin side surface 33cF of the vertical part 33c of the outer lip 33. When the outer-cabin side wall 32a of the hollow seal member 32 is subjected to the large reaction force, this configuration prevents an end of the outer lip 33 on the side of the base root 33b from falling down toward the inner-cabin side with respect to an end of the outer-cabin side wall 32a on a side of the installation base member 31.

With this configuration, the force in a direction that the end of the outer lip 33 on the side of the base root 33b falls down toward the outer-cabin side acts on the end of the outer-cabin side wall 32a on the side of the installation base member 31. This configuration increases force of the rear lip 34 for making elastic contact with the door peripheral edge of the front door 1 and improves sealing performance.

This configuration does not allows appearance of an unnecessary large space among the outer lip 33, a peripheral edge of a door panel and a peripheral edge of the automobile body opening edge and solves problems such as entrance of water and wind, and occurrence of noise. In addition, this configuration prevents the rear lip 34 from straying from the door peripheral edge. Accordingly, water does not enter the inner-cabin side through a gap between the rear lip 34 and the door peripheral edge, and appearance is improved.

Figure 5:
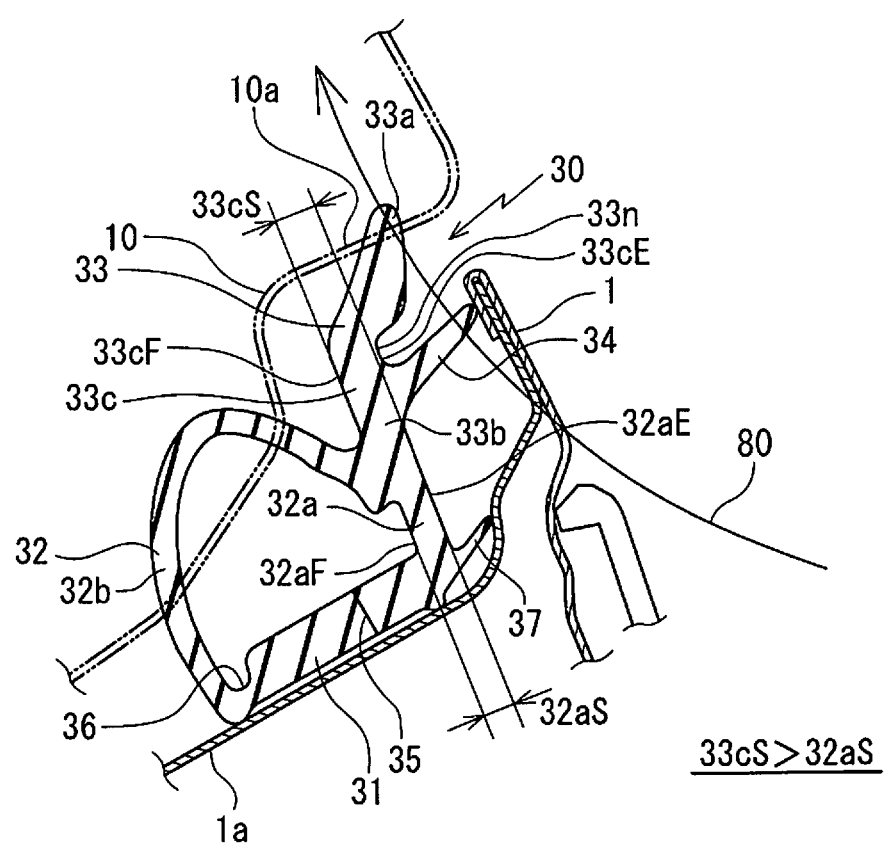
FIG. 5 is an I-I line enlarged cross section of FIG. 8, illustrating a sealing structure according to a comparative example of a door weather strip with respect to the sealing structure according to the embodiment of the present invention of the door weather strip.
Figure 6:
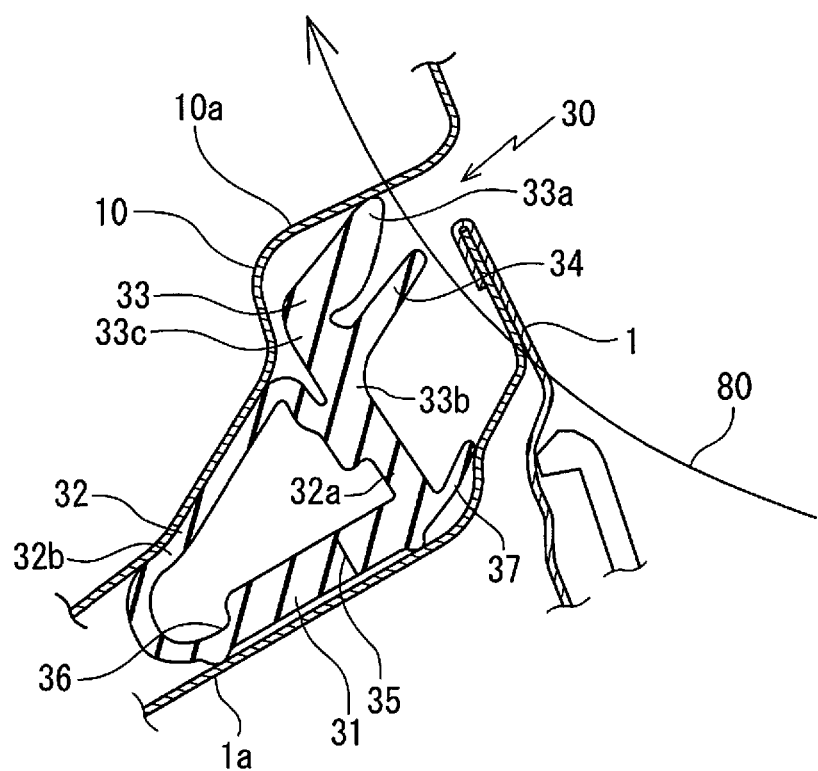
FIG. 6 is the I-I line enlarged cross section of FIG. 8 with the door weather strip of FIG. 5 making elastic contact with the door opening edge of the body.

FIG. 5 and FIG. 6 show a sealing structure according to a comparative example of a door weather strip 30 for comparison with the sealing structure according to the embodiment of the present invention of the door weather strip 30. FIG. 5 shows: the door weather strip 30 prior to making elastic contact with the door opening edge of the body 10; and an imaginary body 10 when the door is in the closed position, which is tentatively piled on the door weather strip 30. FIG. 6 shows the door weather strip 30, which makes elastic contact with the door opening edge of the body 10. In FIG. 5 and FIG. 6, the thickness 32aS of the outer-cabin side wall 32a of the hollow seal member 32 is not more than the thickness 33cS of the vertical part 33c of the outer lip 33; and the inner-cabin side surface 32aF of the outer-cabin side wall 32a of the hollow seal member 32 is closer to an outside of the automobile than the inner-cabin side surface 33cF of the vertical part 33c of the outer lip 33.

When the door is closed and the outer lip 33 makes elastic contact with the vertical surface 10a of the body 10 in the direction which is substantially perpendicular, the outer-cabin side wall 32a of the hollow seal member 32 is subjected to a reaction force directly from the outer lip 33. With this configuration, the reaction force overpowers the thickness 32aS, which is reduced, of the outer-cabin side wall 32a of the hollow seal member 32. In addition, the inner-cabin side surface 32aF of the outer-cabin side wall 32a of the hollow seal member 32 is closer to the outside of the automobile than the inner-cabin side surface 33cF of the vertical part 33c of the outer lip 33. With this configuration, as shown in FIG. 6, an end of the outer-cabin side wall 32a of the hollow seal member 32 on the side of the base root 33b of the outer lip 33 falls down toward the inner-cabin side with respect to the end of the outer-cabin side wall 32a on the side of the installation base member 31.

Figure 2:
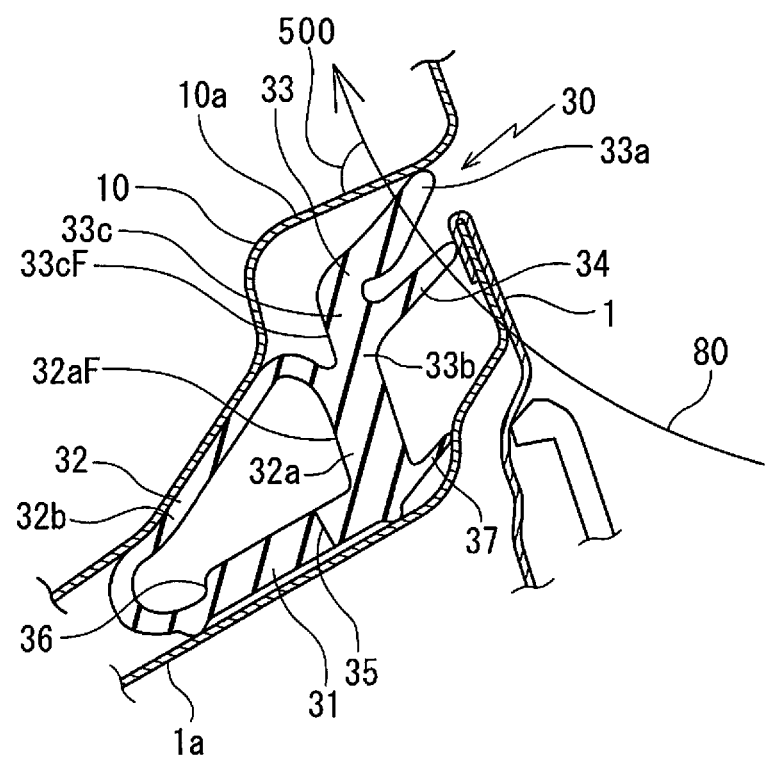
FIG. 2 is the I-I line enlarged cross section of FIG. 8 with the door weather strip of FIG. 1 making elastic contact with a door opening edge of a body.

As the outer-cabin side wall 32a of the hollow seal member 32 falls down toward the inner-cabin side, the rear lip 34 strays from the peripheral edge of the front door 1 and water may enter the inner-cabin side through the gap between the front door 1 and the rear lip 34. To the contrary, In the present embodiment, as shown in FIG. 2, the outer-cabin side wall 32a of the hollow seal member 32 falls down in the direction that the rear lip 34 makes elastic contact with the peripheral edge of the front door 1 and water does not enter the inner-cabin side.

Figure 3:
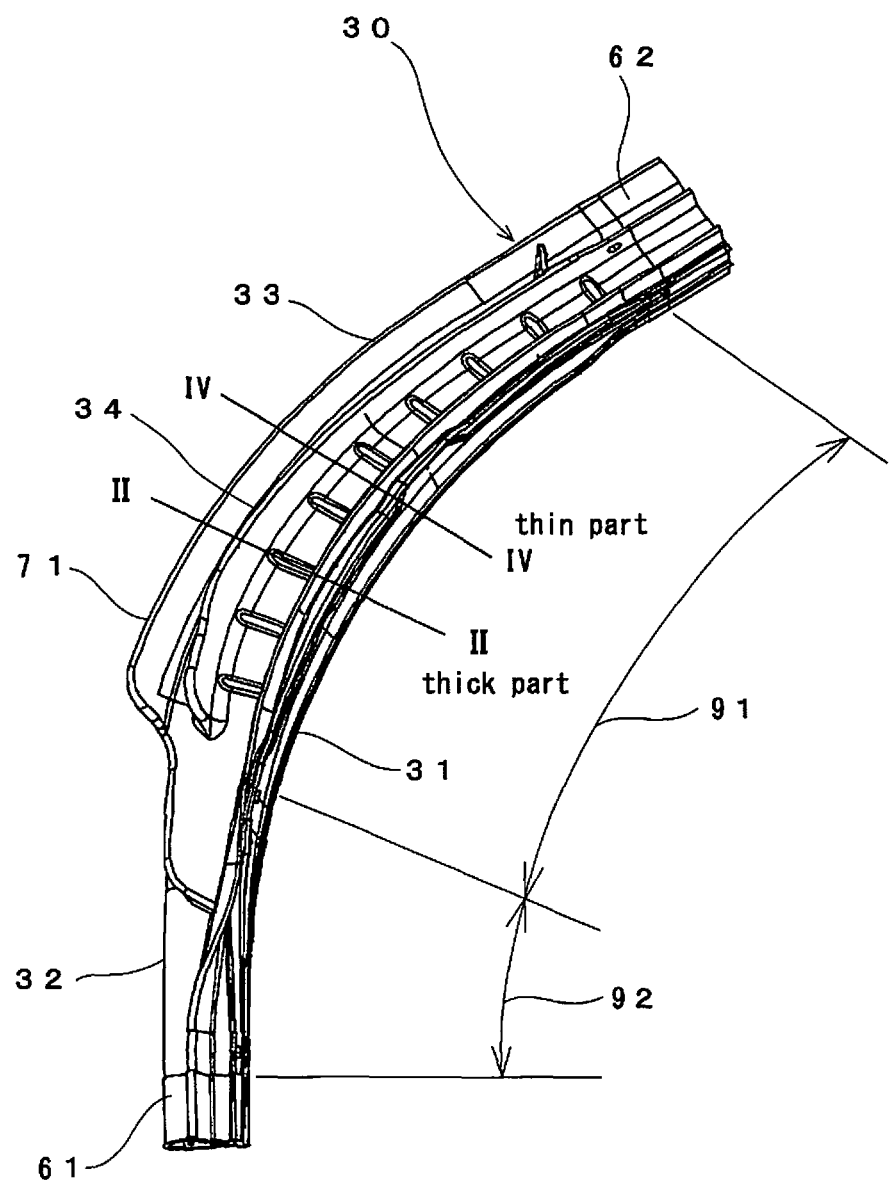
FIG. 3 is an enlarged perspective view of another door weather strip according to an embodiment of the present invention.

In the present embodiment, in a range 91 of the die molded part 71, the part is continuously provided in the longitudinal direction of the door weather strip 30. The part meets conditions that: the thickness 32aS of the outer-cabin side wall 32a of the hollow seal member 32 is not less than the thickness 33cS of the vertical part 33c of the outer lip 33; and the inner-cabin side surface 32aF of the outer-cabin side wall 32a of the hollow seal member 32 is closer to the inside of the automobile than the inner-cabin side surface 33cF of the vertical part 33c of the outer lip 33. But, as shown in FIG. 3 and FIG. 4, the part may be partially provided in the longitudinal direction of the door weather strip 30.

Figure 4:
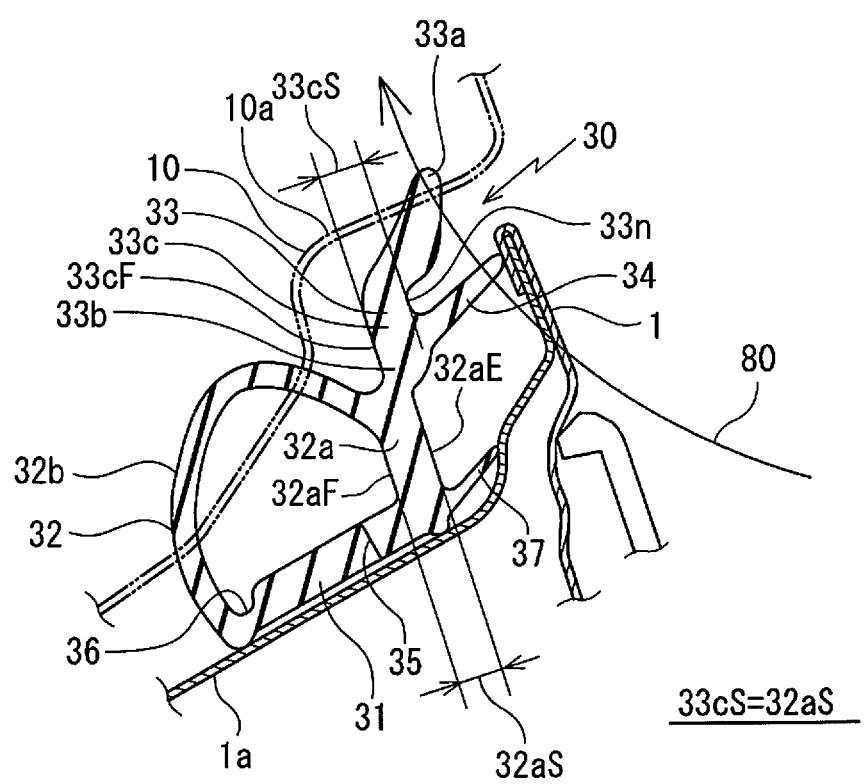
FIG. 4 is a IV-IV line enlarged cross section of FIG. 3, illustrating a thin part of another door weather strip according to an embodiment of the present invention.

Specifically, in the range 91 of the die molded part 71, the thickness 32aS, which is increased, of the outer-cabin side wall 32a of the hollow seal member 32 (II-II line cross section of FIG. 3) and the thickness 32aS, which is reduced, of the outer-cabin side wall 32a of the hollow seal member 32 (IV-IV line cross section of FIG. 3) as shown in FIG. 4 are arranged by turns. The thickness 32aS, which is increased, of the outer-cabin side wall 32a of the hollow seal member 32 (II-II line cross section of FIG. 3) has the same cross sectional shape as the cross sectional shape of FIG. 1. The thickness 32aS, which is reduced, of the outer-cabin side wall 32a of the hollow seal member 32 (IV-IV line cross section of FIG. 3) is formed by scraping the outer-cabin side surface of the outer-cabin side wall 32a toward the inner-cabin side. It is preferable that the thickness 32aS, which is reduced, of the outer-cabin side wall 32a of the hollow seal member 32 is not more than the thickness 33cS of the vertical part 33c of the outer lip 33 and not less than 1 mm for preventing lack of rigidity. In FIG. 4, the thickness 32aS of the outer-cabin side wall 32a of the hollow seal member 32 is the same as the thickness 33cS of the vertical part 33c of the outer lip 33.

The present embodiment exemplifies the sealing structure of the door weather strip 30 in the range 91 of the die molded part 71 on the side of the front door 1. But the present invention is also applicable to a die molded part 72 on the side of the front door 1 and die molded parts 73, 74 of a door weather strip 40 on a side of the rear door 2. It is effective and preferable that the present invention is applied on the die molded parts in a manner that: when the door is closed, the track of movement 80 of the door intersects the vertical surface 10a, which extends in the inner-outer cabin direction, of the body 10 in the direction substantially perpendicular; and the outer lip 33 makes elastic contact with the vertical surface 10a of the body 10 in the direction substantially perpendicular.

I claim:

1. A door weather strip comprising:
an installation base member configured to operatively couple to a peripheral edge of a door of an automobile;
a hollow seal member integrally molded with an inner-cabin side and an outer-cabin side of the installation base member such that the installation base member forms a side of the hollow seal member, the hollow seal member configured to make elastic contact with a door opening edge of a body when the door is in a closed position, an outer-cabin side wall of the hollow seal member having a linear shape and extending from the outer-cabin side of the installation base member in a direction substantially perpendicular to the installation base member toward a side of the door opening edge of the body; and
an outer lip integrally molded with the outer-cabin side wall of the hollow seal member, the outer lip including:
a base root continuous with the outer-cabin side wall of the hollow seal member,
a top end bent in a direction toward an outer-cabin side of the door, and
a vertical part extending toward the door opening edge of the body, the vertical part connecting the base root and the top end of the outer lip, the vertical part being parallel with the outer-cabin side wall of the hollow seal member, the outer lip configured to make elastic contact with a surface of the body such that the outer lip is substantially perpendicular with the surface of the body when the door is closed, wherein:
a thickness of the outer-cabin side wall of the hollow seal member is not less than a thickness of the vertical part of the outer lip;
an inner-cabin side surface of the outer-cabin side wall of the hollow seal member is closer to an inside of the automobile than an inner-cabin side surface of the vertical part of the outer lip:
and wherein first portions of the outer-cabin side wall of the hollow seal member have a first thickness and second portions of the outer-cabin side wall have a second thickness greater than the first thickness, the first and second portions alternating in turns in a longitudinal direction of the hollow seal member.

2. The door weather strip as claimed in claim 1, wherein: the door weather strip comprises a rear lip, the rear lip extending from the outer lip in a direction toward the outer-cabin side of the door, the rear lip configured to make elastic contact with the peripheral edge of the door, the rear lip extending from an outer-cabin side surface of the vertical part of the outer lip.

3. The door weather strip as claimed in claim 2, wherein: the door weather strip includes an extrusion molded part and a die molded part, the die molded part being connected with a lower part of the extrusion molded part, the extrusion molded part configured to be positioned on a roof side of the door and to make elastic contact with a roof of the body when the door is in the closed position.

4. The door weather strip as claimed in claim 3, wherein: the die molded part continuously comprises a part in a longitudinal direction of the door weather strip, the part meeting conditions that: the thickness of the outer-cabin side wall of the hollow seal member is not less than the thickness of the vertical part of the outer lip; and the inner-cabin side surface of the outer-cabin side wall of the hollow seal member is closer to the inside of the automobile than the inner-cabin side surface of the vertical part of the outer lip.

5. The door weather strip as claimed in claim 3, wherein: the die molded part partially comprises a part in a longitudinal direction of the door weather strip, the part meeting conditions that: the thickness of the outer-cabin side wall of the hollow seal member is not less than the thickness of the vertical part of the outer lip; and the inner-cabin side surface of the outer-cabin side wall of the hollow seal member is closer to the inside of the automobile than the inner-cabin side surface of the vertical part of the outer lip.

6. The door weather strip as claimed in claim 1, wherein: the door weather strip includes an extrusion molded part and a die molded part, the die molded part being connected with a lower part of the extrusion molded part, the extrusion molded part configured to be positioned on a roof side of the door and to make elastic contact with a roof of the body when the door is in the closed position.

7. The door weather strip as claimed in claim 6, wherein the die molded part continuously comprises a part in a longitudinal direction of the door weather strip, the part meeting conditions that: the thickness of the outer-cabin side wall of the hollow seal member is not less than the thickness of the vertical part of the outer lip; and the inner-cabin side surface of the outer-cabin side wall of the hollow seal member is closer to the inside of the automobile than the inner-cabin side surface of the vertical part of the outer lip.

8. The door weather strip as claimed in claim 6, wherein the die molded part partially comprises a part in a longitudinal direction of the door weather strip, the part meeting conditions that: the thickness of the outer-cabin side wall of the hollow seal member is not less than the thickness of the vertical part of the outer lip; and the inner-cabin side surface of the outer-cabin side wall of the hollow seal member is closer to the inside of the automobile than the inner-cabin side surface of the vertical part of the outer lip.

9. The door weather strip as claimed in claim 1, wherein the installation base member includes a notch on an inner-cabin side end thereof where the installation base member and a seal wall of the hollow seal member are connected with each other.

10. The door weather strip as claimed in claim 1, wherein the hollow seal member includes a seal wall that extends from an inner-cabin side end of the installation base member to the inner-cabin side of the outer-cabin side wall to form a continuous and singular space of the hollow seal member.

11. The door weather strip as claimed in claim 1, wherein the installation base member has a plate shape.

12. A door weather strip comprising:
a hollow seal member having a seal wall, an installation base member, and an outer-cabin side wall integrally molded together, the installation base member configured to operatively couple to a peripheral edge of a door of an automobile, the outer-cabin side wall being linear and extending from an outer-cabin end of the installation base member in a direction substantially perpendicular to the installation base member, the seal wall extending from the inner-cabin end of the installation base member to an inner-cabin end of the outer-cabin side wall and configured to make elastic contact with a body of the automobile when the door is closed;
an outer lip integrally molded with the outer-cabin side wall of the hollow seal member, the outer lip including:
a base root continuous with the outer-cabin side wall of the hollow seal member;
a top end bent away from the outer-cabin side wall; and
a vertical part extending in a direction parallel with the outer-cabin side wall and connecting the base root to the top end, the outer lip configured to make elastic contact with the body of the automobile such that the outer lip is substantially perpendicular with a surface of the body when the door is closed,
wherein a thickness of the outer-cabin side wall of the hollow seal member is greater than or equal to a thickness of the vertical part of the outer lip;
wherein an inner-cabin side surface of the outer-cabin side wall of the hollow seal member is positioned further in a direction toward the inner cabin end of the installation base member than an inner-cabin side surface of the vertical part of the outer lip;
and wherein first portions of the outer-cabin side wall of the hollow seal member have a first thickness and second portions of the outer-cabin side wall have a second thickness greater than the first thickness, the first and second portions alternating in turns in a longitudinal direction of the hollow seal member.

* * * * *